March 22, 1932.  A. E. COVELLE  1,850,168
OCULIST'S SIGHT TESTING APPARATUS
Filed May 1, 1928
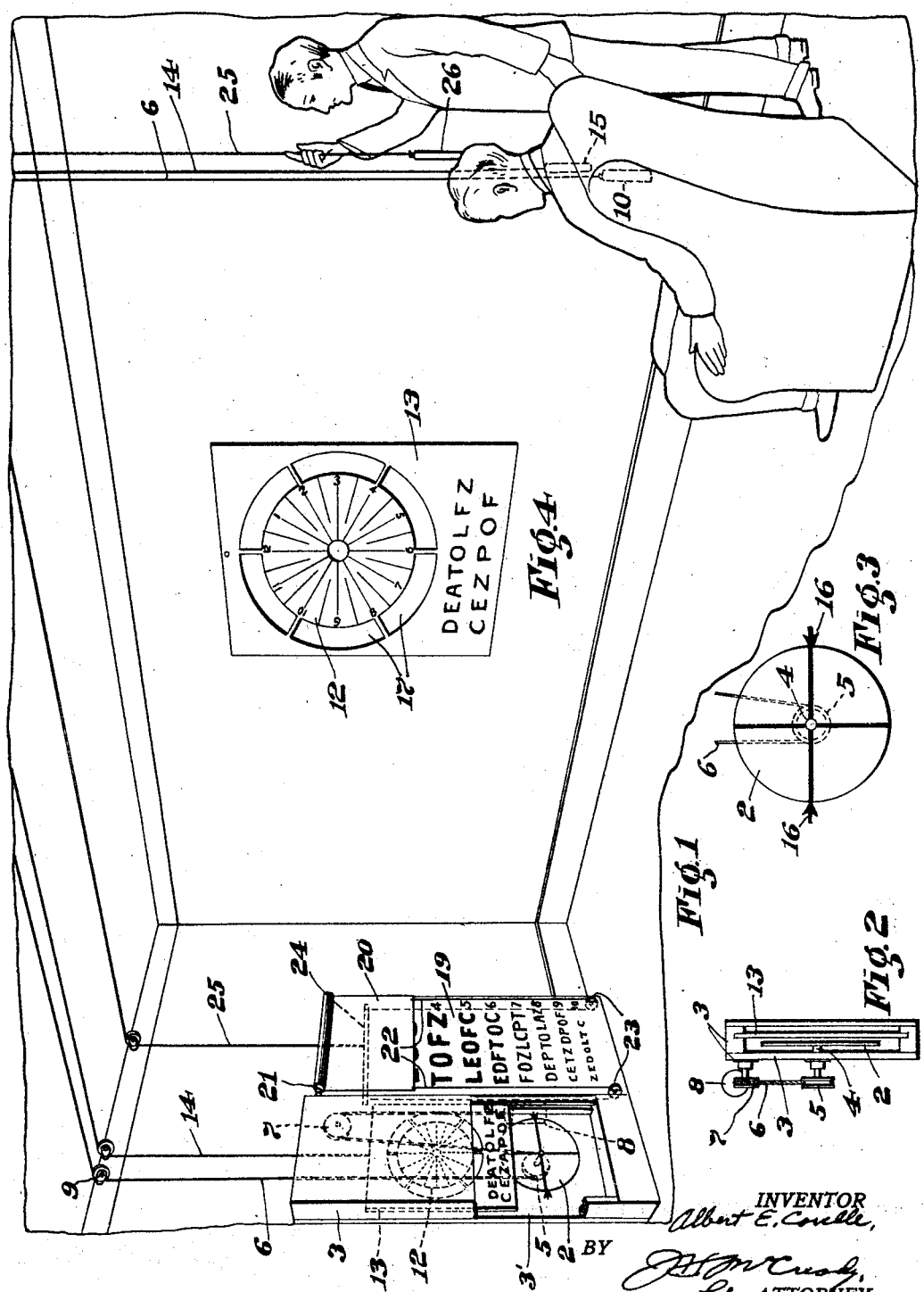
INVENTOR
Albert E. Covelle,
BY
J. H. M'Crosky,
his ATTORNEY Patented Mar. 22, 1932

1,850,168

UNITED STATES PATENT OFFICE

ALBERT E. COVELLE, OF BOSTON, MASSACHUSETTS

OCULIST'S SIGHT TESTING APPARATUS

Application filed May 1, 1928. Serial No. 274,222.

This invention relates to apparatus used by oculists and opticians to test the eyes of patients and to assist them in fitting glasses to correct their errors in vision.

In testing a patient's eyes it is sometimes difficult to understand just what the patient sees and whether or not he is looking at the object which the oculist wants him to look at. It is, therefore, one of the objects of this invention to devise an apparatus in which this difficulty will be substantially eliminated.

In dealing with cases of astigmatism it is preferable to use a chart of a certain type in determining the axis of astigmatism, and to use a chart of a different type in fitting lenses to correct the astigmatism. The invention therefore has for a further object to devise an apparatus in which charts of both types can be used conveniently without waste of time or effort and with a maximum of accuracy in results.

The nature of the invention will be readily understood from the following description when read in connection with the accompanying drawings, and the novel features will be particularly pointed out in the appended claims.

Referring now to the drawings,

Figure 1 is a perspective view illustrating an apparatus constructed in accordance with this invention, some parts of the apparatus being broken away in order better to illustrate details of construction;

Fig. 2 is a plan view of a part of the apparatus shown in Fig. 1;

Fig. 3 is a front elevation of one of the astigmatic charts used in the apparatus shown in Fig. 1; and Fig. 4 is a perspective view of another astigmatic chart used in said apparatus.

The apparatus shown includes an astigmatic chart 2 which is mounted in a cabinet or casing 3. This chart has two heavy lines at right angles to each other extending across its face, as shown in Figs. 1 and 3. It is mounted to rotate about its own axis and for this purpose is secured on the end of a shaft 4 which is supported in bearings provided in the back 3' of the casing 3. At the rear of the casing the shaft 4 is provided with a pulley 5 arranged to be driven by a cord or other flexible member 6, this cord running over a guide pulley 7 and having a weight 8 fastened to one end. From the pulley 5 the cord runs upwardly to a point adjacent to the ceiling and then over a second guide pulley 9 to a point some distance away and immediately over the testing position where the patient usually is seated. It is here guided over a third pulley (not shown) and is extended down to a point within the convenient reach of the oculist or optician. Another weight 10, approximately balancing the weight 8, is secured to this end of the cord.

It will thus be evident that the oculist can rotate the chart 2 into any desired position by raising or lowering the end of the cord 6 to which the weight 10 is fastened.

A chart of the type shown at 2 is preferable in trying different lenses to correct the astigmatism or cylindrical error in a patient's eyes. In order to determine the axis of astigmatism it is preferable to use another type of chart, such as that shown at 12, Fig. 4, this chart being provided with a relatively large number of radial lines. Other charts of this general type may be used in place of it, as will readily be understood by those skilled in this art, some of these charts, for example, having groups of radial lines arranged at different angles. The chart 12 preferably is made on a metal plate 13, or on some equivalent flat surfaced member, and this plate is mounted to slide vertically in the cabinet or casing 3, the opposite side pieces of the casing being grooved, as shown in Figs. 1 and 2, to guide the plate. A cord 14 is fastened to the upper edge of the plate 13 and runs over pulleys similar to those provided for guiding the cord 6 and extends to a point within the convenient reach of the oculist at the testing position or test stand. Preferably a weight, indicated at 15 in Fig. 1, is fastened to this end of the cord to counter-balance the weight of the plate 13.

It will be observed that the rotary chart 2 is provided with arrows or pointers 16—16 at opposite ends of one of the lines thereof, these arrows being fastened to the margin of the chart. Also, that the material of the plate 13 is cut away to provide apertures 17 which practically surround the chart 12, these apertures affording the oculist a clear view of the arrows 16—16 when the chart 12 is located in front of the rotary chart 2.

In using the apparatus it is contemplated that the plate 13 will be lowered until the chart 12 is brought into a position in front of, and register with, the rotary chart 2. Preferably the two charts are made of approximately the same diameter. While the chart 12 is in this position the patient informs the oculist, in answer to his questions, as to which of the lines on the chart appear heaviest or blackest. This determines the axis of astigmatism of the eye being tested, and the oculist then rotates the chart 2 until the line indicated by the arrows or pointers 16—16 coincides with the line on the chart 12 which appears heaviest or blackest to the patient. He leaves the rotary chart in this position and raises the chart 12 into a concealed position within the casing or cabinet 3. The former chart is held in the position to which it is adjusted by the operating mechanism due to the fact that the weights 8 and 10 are approximately balanced. The oculist next tries different lenses until he finds one which will correct the astigmatism, at which time both the vertical and horizontal lines on the chart 2 will look the same to the patient. These operations then are repeated with the other eye.

It will thus be observed that a very convenient arrangement of charts is provided which permits the oculist to use them selectively, one chart only being visible to the patient at a time.

In testing the eyes for distance it is usual to have the patient look at a chart, such as that shown at 19, Fig. 1, which has a series of rows or lines of letters graduated in size. Usually the letters at the top of the chart are very large, while those at the bottom are relatively small, and the patient tells the oculist how far down on the chart he can read clearly. The oculist then places a test frame on the patient's face and inserts trial lenses in it, asking the patient as each lens is placed in position whether or not it enable him to see better or worse. In making these changes the patient's attention sometimes is shifted from the line of letters which he has originally indicated that he could see clearly to a larger line. It is important from the oculist's standpoint to prevent such an occurrence, and for this purpose a roller curtain 20 is provided, this curtain being so arranged that the flexible portion of it can be lowered by the oculist to the line of letters which the oculist wishes the patient to see, larger letters being concealed.

Preferably this curtain is supported on a spring roller 21 of the usual type, the roller being mounted at the upper edge of the chart, and both the roller and the chart being supported on an extension or panel of the cabinet 3. Cords 22 are fastened to the lower edge of the curtain and run over pulleys 23—23 set into the lower part of the cabinet, and then are connected at the back of the cabinet to a spreader bar 24. A cord 25 is secured to this bar and is guided over pulleys like those provided for the cord 6, the cord 25 running to a point at the test stand where a weight 26 is fastened to it. The dogs or pawls which are usual in a curtain roller are omitted from the roller 21 and the weight 26 is made of sufficient mass to counter-balance the effort of the spring so that the curtain 20 will stay in any position to which it is adjusted.

This arrangement enables the oculist to confine the patient's attention to any desired line of letters.

It will be appreciated that the invention provides a relatively simple form of apparatus which can be manufactured economically and which is of material assistance to the oculist in testing and fitting eyes. The fact that all the operating devices for making the adjustments or moving the charts are located at the test stand and within convenient reach of the oculist saves his time and energy. The apparatus also assists the oculist very materially in obtaining greater accuracy in his corrections for the defects in the patient's vision.

While I have herein shown and described a preferred embodiment of my invention, it will be understood that the invention may be embodied in other forms without departing from the spirit or scope thereof.

Having thus described my invention, what I desire to claim as new is:

1. In an oculist's testing apparatus, the combination of an astigmatic chart, means supporting said chart for rotation about its axis, means operable at a distance from said chart for rotating it about said axis, a second astigmatic chart different from the first chart, and means supporting said charts for relative bodily movement in a fixed path to position one in front of and in register with the other and for additional movement out of such relationship.

2. In an oculist's testing apparatus, the combination of an astigmatic chart, means supporting said chart for rotation about its axis, means operable at a distance from said chart for rotating it about said axis, a second astigmatic chart different from the first chart, means supporting said second chart for bodily movement in a fixed path into and out of register with the first chart, and means operable from said testing position distant from said apparatus for moving said second chart into or out of register with the first chart.

3. In an oculist's testing apparatus, the combination of an astigmatic chart having radial lines thereon, means supporting said chart for rotation about its axis, means operable at a distance from said chart for rotating it about said axis, a second astigmatic chart having differently arranged radial lines thereon, and means supporting said charts for relative bodily movement to position one in front of and in register with the other and permitting them to be relatively moved out of such relationship, the rear chart having parts visible from a distant testing position when the other chart is in front of it, whereby the rotary chart can be revolved to bring its radial lines into agreement with any desired radial lines of the other chart.

4. In an oculist's testing apparatus, the combination of an astigmatic chart, a casing in which said chart is mounted, means supporting said chart for rotation about its axis, a plate having a second astigmatic chart thereon, said plate being supported in said casing for movement to carry its chart into or out of register with said rotary chart, pointers on the margin of said rotary chart, said plate being cut away around the chart thereon to afford a view of said pointers, and operating devices for revolving said first chart and for moving said second chart into or out of register with it, said operating devices extending to a testing position located at a distance from said casing.

5. In an oculist's testing apparatus, the combination of an astigmatic chart having radial lines thereon, a casing in which said chart is mounted, means supporting said chart for rotation about its axis, means operable at a testing position distant from said casing for rotating said chart on its axis, a plate having a second astigmatic chart thereon, said second chart having radial lines thereon arranged differently from those on the first chart, said plate being supported in said cabinet for sliding movement to carry its chart into or out of register with said rotary chart, parts of said rotary chart being visible from said testing position when the second chart is in register with the rotary chart, whereby the latter chart can be revolved to bring its radial lines into agreement with any desired radial lines of the second chart, and means for sliding said second chart into and out of register with said first chart including an operating device extending to said testing position.

ALBERT E. COVELLE.